United States Patent
Bashan et al.

(10) Patent No.: US 6,202,927 B1
(45) Date of Patent: Mar. 20, 2001

(54) DUAL MODE PROXIMITY AND IN-RANGE SMART CARD DATA TRANSACTION SYSTEM

(75) Inventors: Oded Bashan, Carmiel; Nehemya Itay, Kibbutz Kfar Giladi; Ronnie Gilboa, Moshav Beit Hillel; Moshe Aduk, Korazim, all of (IL)

(73) Assignee: On Track Innovations Ltd., Rosh Pina (IL)

( * ) Notice: Subject to any disclaimer, the term of this patent is extended or adjusted under 35 U.S.C. 154(b) by 0 days.

(21) Appl. No.: 09/093,390

(22) Filed: Jun. 9, 1998

(30) Foreign Application Priority Data

Apr. 3, 1998 (IL) .......................................... 123949

(51) Int. Cl.[7] ................................................. G06K 7/08
(52) U.S. Cl. ............................................ 235/451; 235/492
(58) Field of Search ................................. 235/451, 492, 235/375, 385; 340/825.34, 825.54, 10.1, 10.34

(56) References Cited

U.S. PATENT DOCUMENTS

| 4,641,374 | 2/1987 | Oyama ................................ 455/603 |
| 4,792,996 | 12/1988 | Oyama . | |
| 5,083,013 | 1/1992 | Levionnais . | |
| 5,206,495 | * 4/1993 | Kroft ................................... 235/492 |
| 5,212,373 | * 5/1993 | Fujioka et al. ..................... 235/492 |
| 5,225,667 | * 7/1993 | Furuta et al. ...................... 235/492 |
| 5,241,160 | 8/1993 | Bashan et al. ..................... 235/380 |
| 5,245,346 | 9/1993 | Nishimura et al. . | |
| 5,444,222 | 8/1995 | Inoue ................................. 235/380 |
| 5,491,672 | 2/1996 | Ferris ............................. 235/377 X |
| 5,682,142 | 10/1997 | Loosmore et al. .............. 235/385 X |
| 5,821,525 | * 10/1998 | Takebayashi ...................... 235/492 |
| 5,889,273 | * 3/1999 | Goto ................................... 235/492 |
| 6,000,606 | * 12/1999 | Dethloff ............................. 235/375 |
| 6,010,074 | * 1/2000 | Kelly et al. ......................... 235/492 |
| 6,010,075 | * 1/2000 | Ishifuji et al. ..................... 235/492 |
| 6,036,100 | * 3/2000 | Asami ................................ 235/492 |

FOREIGN PATENT DOCUMENTS

| 0534559 | 3/1993 | (EP) . |
| 0818756 | 1/1998 | (EP) . |
| 2663145 | 12/1991 | (FR) . |
| 2260438 | 4/1993 | (GB) . |
| 2-196390 | * 8/1990 | (JP) . |
| 3-262089 | * 11/1991 | (JP) . |
| 404007689 | * 1/1992 | (JP) . |

* cited by examiner

Primary Examiner—Michael G Lee
Assistant Examiner—Jared J. Fureman
(74) Attorney, Agent, or Firm—Brody and Neimark

(57) ABSTRACT

A data transaction system for process monitoring, with smart cards of the ISO geometric dimensions, featuring contact and bi-directional inductive coupling communication, for collecting and storing data. The system comprises fixed triggering stations for short range data transfer with the smart cards in response to emissions from sensors. The sensors report data related to variables such as location, device status, operation sequencing and time. A send-and-receive station allows for downloading of the stored data and for loading instruction sets in contact or contactless mode. The smart cards comprise a signal amplifier, transceivers, a processor, memories, timer, an on-board battery, cognizable non-compliance warning, optional feedback and energy saving procedures.

34 Claims, 9 Drawing Sheets

DUAL MODE PROXIMITY AND IN-RANGE SMART CARD DATA TRANSACTION SYSTEM

FIELD OF THE INVENTION

The invention relates generally to a data transaction system for process monitoring and event tracking. In particular the invention relates to such a system for monitoring personnel who are obligated to perform operations in a specified sequence so as to ensure that act accordingly.

BACKGROUND OF THE INVENTION

Smart cards, or data transaction cards, for carrying out data transactions are in wide use and well known per se. A concise introduction to the nomenclature and principal features of smart cards, also called data to transaction cards, is found in a paper by Gilles Lisimaque, presented at the 27th International SAMPE Technical Conference, on Oct. 9–12, 1995.

The term "smart card" as used below refers to a data card with the geometrical dimensions of an ISO 7816 standard contact card: about 86×54×0.8 mm and having either a contact or contactless interface or a combined contact/contactless interface as described, for example, in our co-pending Israel Patent Application No. 119943 filed on Dec. 31, 1997.

Smart cards have historically been used to perform passive tasks only which are not time-related, mainly for identification, authentication, and data collection duties, by contact and/or contactless communication. However, there are many situations wherein it is necessary to perform different actions according to a sequence of time-related operations. For example, rather than merely condition a smart card's response on passive data stored therein as has been done so far, it would be advantageous to allow the smart card to respond to data as it is received in accordance with the received data.

However, current smart cards lack the autonomous processing and communication capability needed for controlling industrial processes, usually involving time and performance monitoring adaptable to various situations. Thus for smart cards to be considered for manufacturing tasks and to become cost effective, there is required an improvement in those features related to processing, transaction and response to sensors. In order that the smart card may remain compact, the enhanced processing facility must not unduly increase its power consumption and this has tended to militate against the use of smart cards for such applications.

U.S. Pat. No. 5,491,672 in the name of R. Ferris describes a system using RF tags to monitor a watchman's performance. Ferris discloses a system with the use of a portable interrogation time clock unit carried by a watchman for receiving a passive answer when coming in range of an RF tag or card located at a site to be visited. The unit carried by the watchman is bulky and employs radio frequency communication with relatively high power consumption. Consequently, such a system lacks the convenience and portability associated with smart cards. Furthermore, the task of the static RF tags or cards is entirely passive and the system is not designed to deliver a warning or a reminder if a required task is neglected.

Another attempt to create an advanced monitoring system is found in U.S. Pat. No. 5,682,142 to Loosmore et al., describing a network of fixed stations and movable tags communicating with each other. Loosmore does not provide a system of autonomous stations and smart cards but rather requires that the component devices are interconnected in a network formation. This allows mutual communication between all nodes in the network, both fixed and moving. It does not appear that such a system is constrained by low energy requirements which are less relevant to node tags than to smart cards. Furthermore, data transfer via wireless transceiver which is inherently power-consuming.

Although smart cards are inherently well suited for portable, low-power applications, known smart cards suffer from low range communication, usually in the order of only 30 to 50 cm. This is acceptable for passive systems wherein a moveable transponder is brought into close proximity with a fixed station as is typically the case when data in the smart card is to be read by the station. However, it militates against the use of smart cards for process monitoring where relatively long range communication between the station and transponder is required in the order of several meters.

SUMMARY OF THE INVENTION

It is therefore a principal object of the invention to provide a smart card having an extended operating range.

A further object of the invention is to exploit the extended range of such a smart card in a data transaction system allowing the central monitoring of events according to a sequence of time-related operations.

These objectives are realized in accordance with a broad aspect of the invention by means of a data transaction card comprising:
  a semiconductor device coupled to an antenna coil for data communication with a remote antenna so as to receive a signal therefrom, and
  an amplifier coupled to the antenna coil for amplifying said signal so as thereby to extend an operating range of the data transaction card.

According to a further aspect of the invention, there is provided a data transaction system, comprising a portable data transaction card, a triggering station for triggering the data transaction card from a "dormant" state to an "active" state or vice versa, and at least one device within an area served by the triggering station for producing a device signal indicative of an event associated with said device,
  the data transaction card comprising:
    a memory for storing a predetermined instruction set and for storing data indicative of said event,
    a card triggering receiver for effecting inductive coupling with the triggering station so as to receive a triggering signal produced thereby upon passage into said area,
    a processing unit coupled to the card triggering receiver and to the memory for operating in accordance with said predetermined instruction set in response to said event, and
    a battery for supplying energy to components of the data transaction card.

"Short range" communication over a distance of up to 15 meters is achieved between the data transaction card and the triggering station. By such means, the data transaction card is not forced to come into immediate proximity with the triggering station to establish communication. Preferably, the data transaction card is not limited to one mode of communication but combines short range, proximity and contact communication to take advantage of the mode most appropriate to a given situation.

In order to minimize energy consumption thus saving battery power, the data transaction card remains dormant until triggered by the triggering station. If desired, the battery may be rechargeable so as to allow recharging either by inductive coupling communication or by contact. The data transaction card is programmed to respond to different events and store data which may subsequently be downloaded to a data logger or interrogating station, using either a conventional contact or contactless interface.

Preferably, at least two triggering stations are provided each comprising a triggering transceiver for effecting data transfer with the smart card by inductive coupling communication. The system may thus collect and store data from the triggering stations, discretely, when coming in proper range.

The smart card is preferably provided with time keeping abilities in order that data stored therein may be correlated to the time of a respective event. In the event of non-compliance with the predetermined requirements, a suitable warning may be given to the card owner.

The invention also contemplates an integrated system including send and receive stations for proximity inductive communication with the smart card, thus allowing data and instructions to be downloaded to the card and permitting the card to be interrogated.

BRIEF DESCRIPTION OF THE DRAWINGS

To better understand the invention and to realize how the same may be carried out in practice, some preferred embodiments will now be described, by way of non-limiting example only, with reference to the accompanying drawings, in which.

DETAILED DESCRIPTION OF PREFERRED EMBODIMENTS

Figure 1:
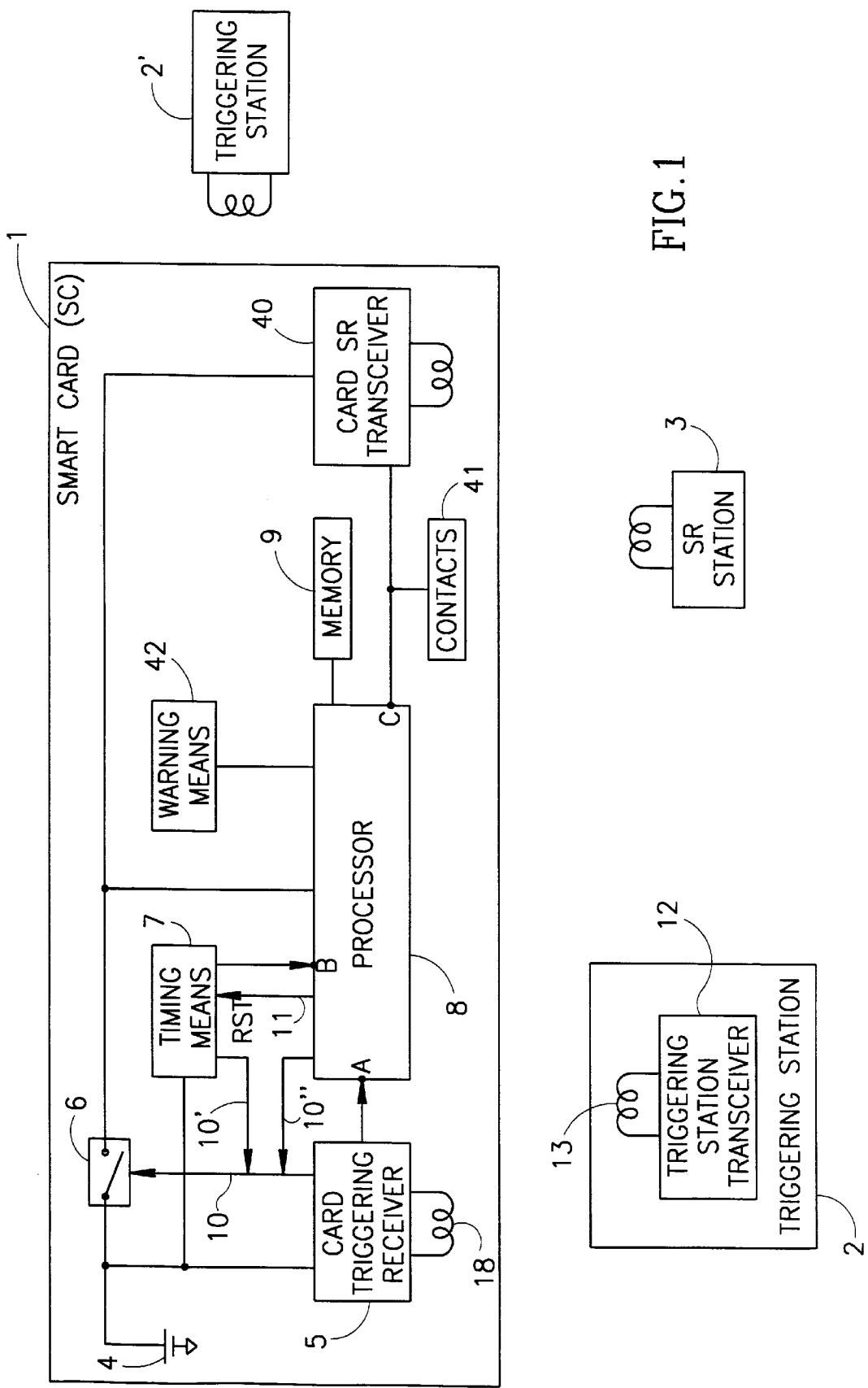
FIG. 1 is a block diagram showing schematically a data transaction and monitoring system according to a first embodiment of the invention.

Reference is now made to FIG. 1 showing functionally a data transaction system comprising a smart card (SC) 1, at least two triggering stations (TS) 2 and 2' and a Send and Receive station (SRS) 3. TS 2, TS 2' and other TSs are identical but for their identity number and may be located and moved as required. The TS serves to emit modulated inductive emissions which in turn are received and collected by the smart card 1, usually in relation to time, as will be explained in detail below.

The SC 1 comprises a card triggering receiver 5 for the reception of modulated inductive emissions, at short range, from the TS 2 or the TS 2'.

The SC 1 may receive the emissions emanating from the TSs when coming within range.

The Send and Receive Station 3, or SRS 3, is built for bi-directional contactless/contact communication with SC 1, as will be explained in detail below.

In general, the purpose of the data transaction system is to monitor processes involving manufacturing or personnel, where the SC 1 may, for example, accompany a part undergoing successive operations such as in a machining process, or be worn by a user bound to a regulated behavior of actions to be performed.

Usually, the SC 1 is kept in dormant state for energy conservation purposes, but the SC 1 is triggered to an active state when coming within range of the TS 2 and then, when awakened, the SC 1 starts to perform according to a set of stored instructions. Such instructions may call, e.g., for the collection of data, for recording of time and for dispatch of a warning, for instance, to alert an industrial system or to call to the attention of the bearer of SC 1 that an action needs to be taken in order to comply with instructions.

The main components of the SC 1 are also shown in FIG. 1 and comprise a battery 4 for supplying energy to the components of the SC 1, which battery 4 is non-interruptably coupled to a card triggering receiver 5, to the upstream side of the power switch 6 and to timing means 7. The power switch 6 has three ports (not enumerated in FIG. 1), an upstream port connected to the battery 4, a control port coupled to a first control link 10 and a downstream port coupled to the processor 8 as well as to other components of the SC 1, as will be explained in detail below. The processor 8 manages functions of the SC 1 and is also coupled to the memory 9 and to the timing means 7. It is implied herewith that the term memory refers to a non-volatile type of memory that ensures that the data stored therein remains intact even when the supply of power is disconnected. Memory 9 may be implemented either as a separate component coupled to processor 8 or as an inherent part of processor 8, or as a combination of separate and intrinsic memories, non-volatile in either case so as to retain the data stored therein unaltered, even when battery 4 is disabled. It is practical to store process rules in the form of a predetermined instruction set in a code memory (not shown in FIG. 1) located within the processor 8 and to store collected data in memory 9.

The card triggering receiver 5 of SC 1 is coupled to the control port of the power switch 6 by the first control link 10, through which signals may be sent for the closing or opening of the power switch 6, for respectively connecting or disconnecting the battery 4 from the components located downstream of the power switch 6. The power switch 6 thus disconnectably couples power to processor 8, to the memory 9 and to other components of the SC 1.

Usually the SC 1 is kept in a low power-consumption, thus energy saving or dormant state, with the power switch 6 open, so that the battery 4 is disconnected from the components of the SC 1 downstream of the power switch 6. When the SC 1 comes within emission range of the TS 2, the card triggering receiver 5, powered by battery 4, detects the emissions of TS 2 and generates a signal which is forwarded through the first control link 10 to the control port of power switch 6 for commanding closure of the power switch 6. Closure of the power switch 6 provides power to the components of the SC 1, thus raising the SC 1 to activate state. When SC 1 is in the active state, the components of the SC 1 located downstream of the power switch 6 become operable, and in particular, also processor 8, controlling functions of the SC 1, and the memory 9.

A timing means 7 is provided in the SC 1 to keep a time reference of events related to the functions of the data system, such as for example the occurrence of some specific data transfer. The purpose of the timing means 7 is to furnish a reference to the amount of elapsed time without suffering the penalty of the relatively heavy energy expense of a conventional timing circuit. For this reason the timing means 7 is implemented as a counter for counting a predetermined number of counts and once that predetermined number of counts is tallied, this event is stored in memory as one single pulse, representative of one unit of elapsed time. Timing means 7 act as a repetitive counting means, sending pulse after pulse to memory 9 in a cyclical process, as will be explained in more detail below. Evidently, storage of a pulse in memory 9 demands that the SC 1 first be awakened to active state to render the processor 8 and the memory 9 operable.

A real time clock may be preferred instead of the timing means 7. In such case, there is no need for the SC 1 awakening procedure from dormant to active state for the accumulation of elapsed time pulses in memory. Rather, time is continuously supplied by the real time clock without need to resort to memory 9 for storing pulses.

To raise the SC 1 to active state for storage of a pulse from timing means 7 in memory 9, a signal is sent out by the timing means 7 over a second control link 10' connecting the timing means 7 to the first control link 10 and to the control port (not shown in FIG. 1) of the power switch 6. A control signal is thus forwarded from the timing means 7 to the power switch 6 for the latter to close, thereby rendering active the SC 1, including the processor 8 and the memory 9. It becomes now possible for the counter of the timing means 7 to deliver one pulse, representative of one unit of elapsed time, to the processor 8 which takes measures to store the pulse in the memory 9 where it accumulates in the count of elapsed time.

After this one pulse emanating from the counter of the timing means 7 is safely stored in the memory 9, the processor 8 sends out a reset command to the timing means 7, to reset to zero the counter (not shown in FIG. 1). The reset command is delivered through a reset link 11 coupling the processor 8 to the counter of the timing means 7. After being reset to zero, the counter immediately starts to repeat the process of accumulating counts, under direct power from the battery 4. Thus, now that the counter 7 has been reset, there is no more need to keep the processor 8 and the SC 1 in active state while the counter keeps counting. Therefore, to save energy, the processor 8 commands the SC 1 to return to the dormant state by ordering the opening of the power switch 6. This command is relayed through a third control link 10" coupling the processor 8 to the first control link 10 and to the control port (not enumerated in FIG. 1) of the power switch 6. The command from processor 8 is thus routed via the third control link 10' to the first control link 10 and to the control port so as to open the power switch 6, thereby disconnecting those components of the SC 1 located downstream of the power switch 6, with the intention of diminishing the amount of energy drawn from the battery 4.

Figure 2:
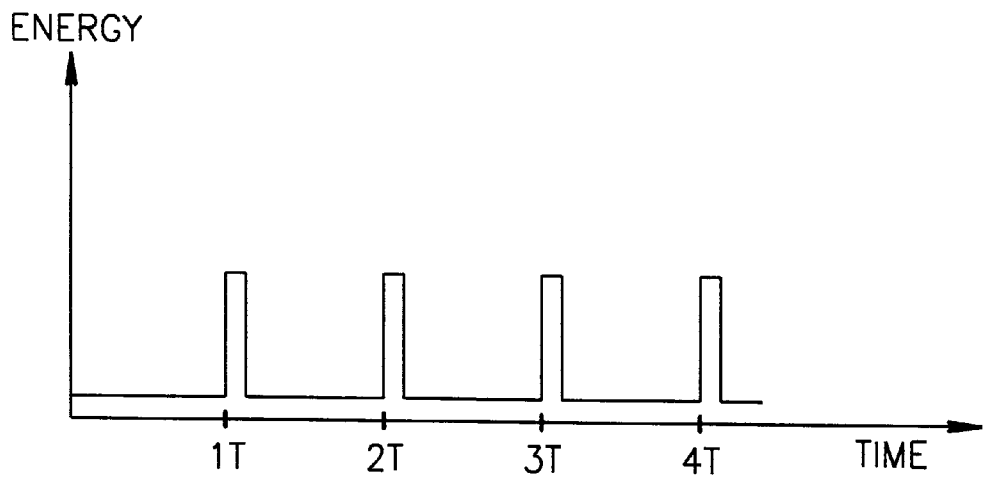
FIG. 2 shows schematically an energy consumption diagram associated with a timer within a smart card for use in the system of FIG. 1.

The method of accumulating counts and pulses described above is a repetitive process, depicted in FIG. 2, as a stream of pulses, with time elapsed on the ordinate and energy consumption on the abscissa. FIG. 2 shows the energy consumption of SC 1 for the operation of the counter of the timing means 7, starting from the origin, where the SC 1 is in the dormant state, until counts are accumulated for the first pulse to be sent on 1T, representing one elapsed time unit. The timing means 7 commands the power switch 6 to connect the battery 4 to components downstream of the power switch 6, whereupon the SC 1 is rendered active and energy consumption rises vertically to the operating voltage for a short duration at time 1T on the ordinate. The higher expenditure of energy lasts until the unit pulse is stored in memory 9 by processor 8, after which SC 1 is returned to dormant state and energy expenditure decreases vertically down and the counting process repeats itself. The energy conservation is clearly seen in that the span of the sum of the narrow pulses at times 1T, 2T, 3T and so on, representing the time for which the SC 1 is active and is consuming more energy, is much shorter than the period during which the counter is accumulating counts in the dormant state.

The modulated inductive emissions from the Triggering Station 2, or TS 2, to the SC 1 will now be described. As seen in FIG. 1, the TS 2 comprises a TS transmitter 12 coupled to a TS loop antenna 13 which continuously emits modulated emissions with a superimposed data signal comprising the identity of the TS 2. The TS transmitter 12 emits preferably at 125 KHz, as is usually used for inductive coupling communication with smart cards for ranges of up to 3 m. With proper amplification and filtering circuits in the SC 1, it is feasible to extend the range of the SC 1 to 15 m, still with low power consumption.

Figure 3:
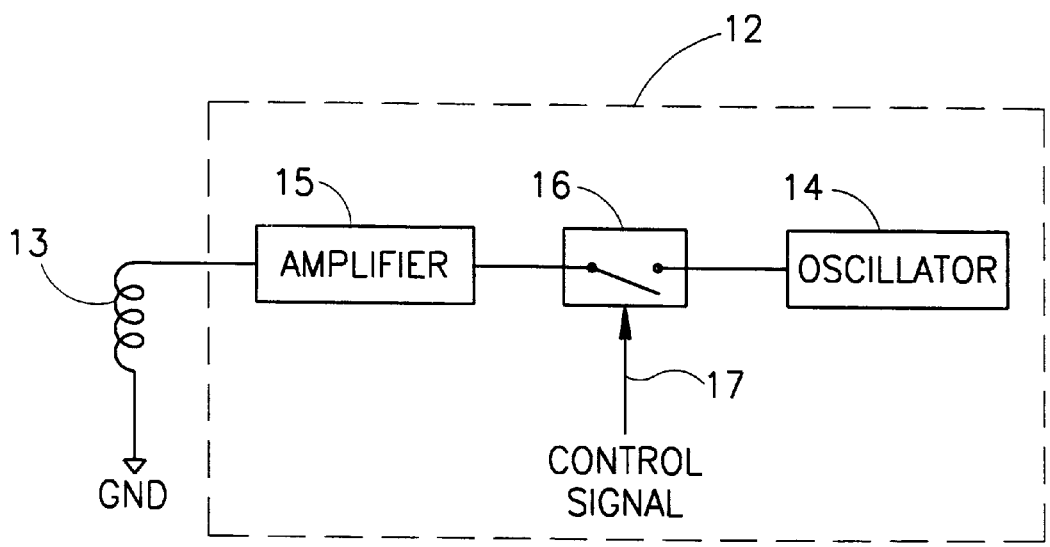
FIG. 3 is a block diagram showing functionally a fixed station transmitter for use in the system shown in FIG. 1.

Referring now to FIG. 3 of the drawings, the generation of modulated data will be explained. The TS transmitter 12 comprises an oscillator 14 for the generation of the carrier wave, coupled to an amplifier 15, itself coupled to the TS loop antenna 13 connected to ground. A control signal switch 16, operated by a control signal 17, is inserted between the output of the oscillator 14 and the input to the amplifier 15 to allow coupling or decoupling of the amplifier 15 from the oscillator 14. Operation of the control switch 16 allows for the modulation of the carrier, thereby permitting to superimpose well defined control signals on the carrier wave, such as corresponding to a given succession of bits.

Figure 4A:
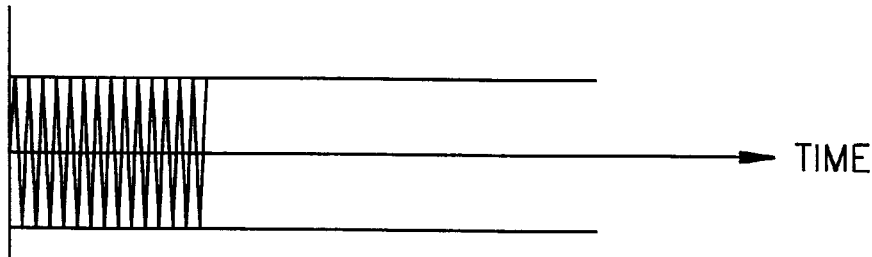
FIGS. 4a, 4b and 4c are graphs depicting modulated data signals associated with the smart card.
Figure 4B:
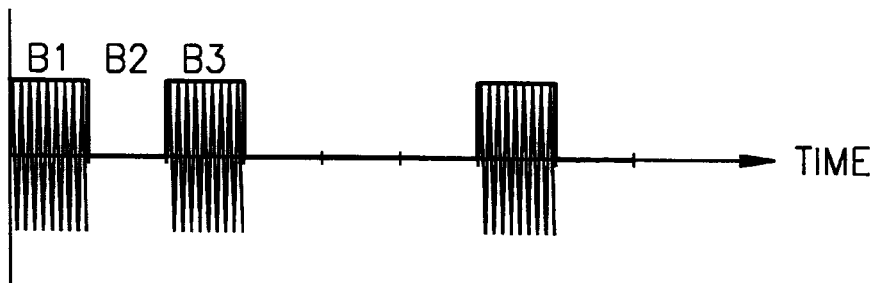
Figure 4C:
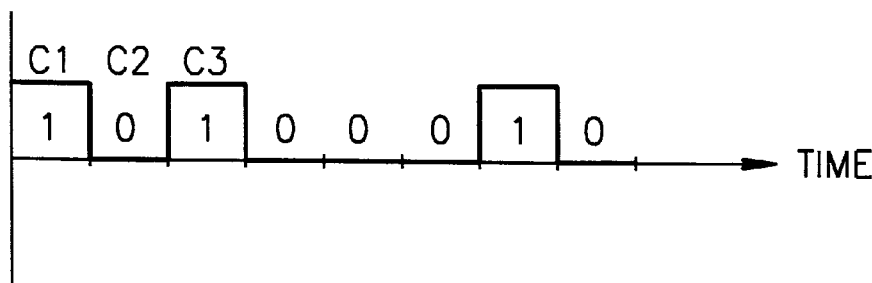

FIG. 4 shows the effect of the coupling/decoupling of the control switch 16 on the emissions from the TS transmitter 12 in the sequences 4(*a*) to 4(*c*), all with the same time basis t. The continuous emission of a high frequency carrier wave by TS transmitter 12 is shown by 4(*a*). Sequence 4(*b*) now illustrates the carrier wave modulated by the control signal 17 as result of the consecutive opening/closure of the control switch 16, for example corresponding to 10100010 (binary). 4(*b*) starts with the control switch closed during the period b1, whereby antenna 13 emits the signals originating from the oscillator 14 as amplified by amplifier 15. This condition of unobstructed emission corresponds to logical 1, as depicted by c1 in FIG. 4 at 4(*c*) which represents the envelope of the wave train of 4(*b*). Next, the control switch 16 is opened, under actuation of control signal 17, thus decoupling the oscillator 16 from the amplifier 15 so that antenna 13 stops to emit, as represented by b2 in 4(*b*) and by c2 in 4(*c*). Closure, opening and closure again of the control switch 16 are thus represented by b1, b2 and b3 in 4(*b*) corresponding to c1, c2 and c3 in 4(*c*) of FIG. 4. The control signals 17 thus represent the data to be transmitted and the emission from TS 2 produce a data transaction with modulated data in the form of a square wave pattern. The implementation of such an emission technique, well known in the art, is found, for example in U.S. Pat. No. 5,241,160 assigned to On Track Innovations (OTI).

The modulated inductive data emissions sent to the SC 1, as depicted in FIG. 4(*c*), must be deciphered by the processor 8 who must first be awakened. It is processor 8 who decides in which discrete state to set the SC 1, such as to command entering dormant state or to switch from a first active state to another active state. The active state may define the activation of all the components of the SC 1 while another active state, such as a second active state, third active state and so forth, might refer to one, or more specific components being kept deactivated to save power. For instance, once processor 8 detects that a process has started or that a certain time has been reached, it might be advantageous to disconnect a component or a group of components that do not participate in the activity taking place. It is understood that the dormant state of SC 1 is characterized as a "stand-by" condition with minimal SC 1 power use and the active state is defined as the operation of all the components available, with maximum energy expenditure. As explained above, the active state may comprise other well defined active states or secondary states of lesser activity, with less power supply demands.

The information received by processor 8 may be related to the activity of processor 8 or to time, and may also represent data related to events. An event may happen at a location, such as the emission of data, say the identity of a station, associated with an emplacement. An event may also represent an activity, say the identity of another station, again symbolized by data being emitted in response to the activation of a device. Still another event might be related to time, like the emission of time itself or of a time-related signal, in conjunction with an activity.

Data and time are stored in memory 9, in mutual reference to each other. Data is always composed of a chain of bits representing a communication of data or a certain protocol. For example, communication might be received by the SC 1 causing it to switch from the dormant to the active state, while the information contents received may point to the identity of a certain workstation or to the time.

The inductive emissions from the TS 2 shown in FIG. 1 are inductively received by the card triggering loop antenna 18, coupled to the card triggering receiver 5 of the SC 1, at ranges as distant as "short range" communication. "Short range" is defined as a distance of up to 15 m and at such a distance the signal received by the SC 1 is very weak, so weak that it must first be amplified before it may be used.

Figure 5:
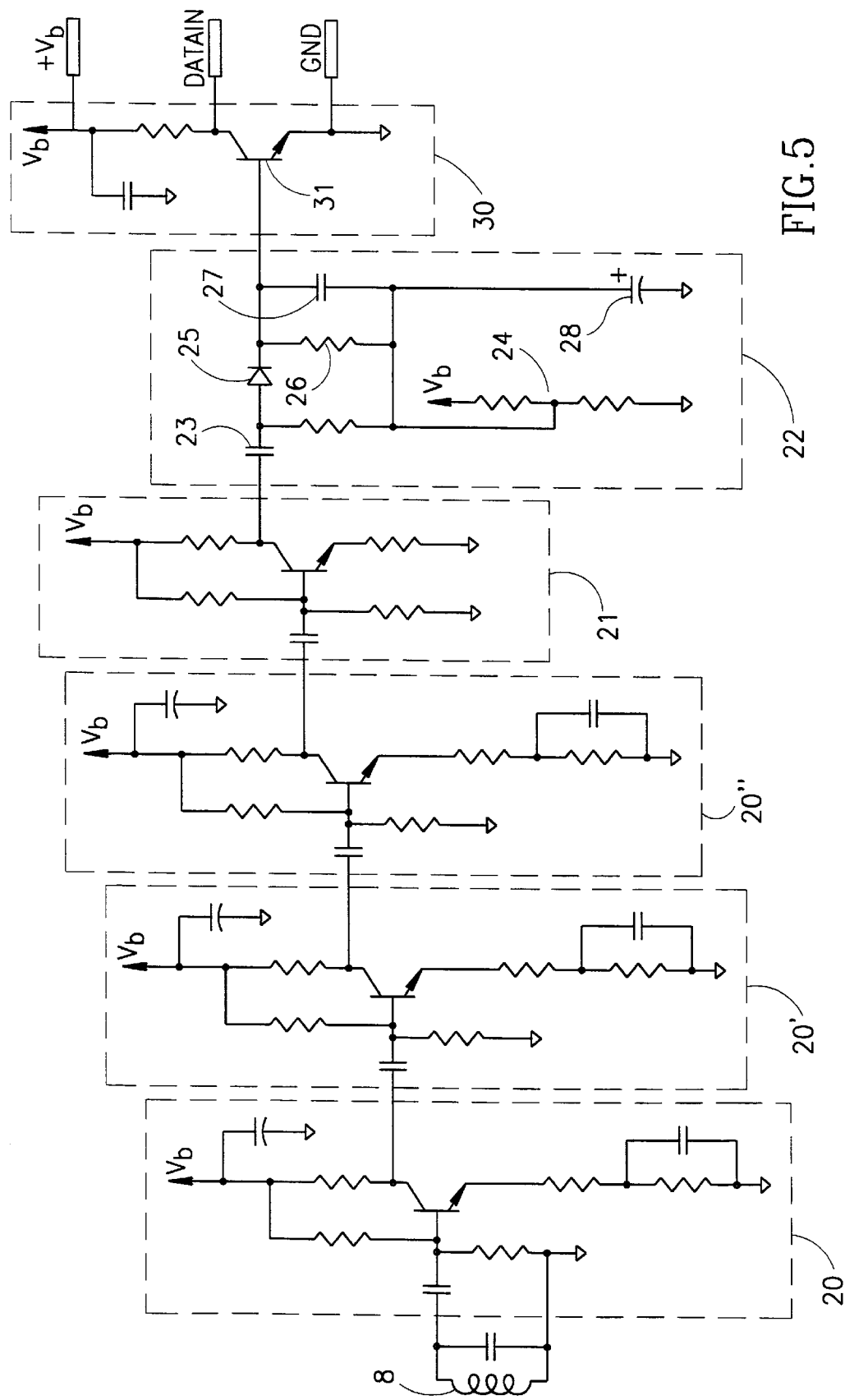
FIG. 5 is a circuit diagram showing a first detail of an electrical circuit of the smart card.

The card triggering loop antenna 18 thus receives the inducted emissions of the TS 2 as a weak signal, of the order of magnitude of a micro volts. To be processed, such a small signal must first be amplified or else it remains useless. FIG. 5 shows the card triggering receiver in greater detail, where the amplification process consists of a chain of amplifiers, coupled in series to the card triggering loop antenna 18. First comes a cascade of small signal amplifiers, such as three amplifiers for example, enumerated as 20, 20' and 20", each amplifying the input voltage by say, one order of magnitude. Small signal amplifiers are well known in the art and a description thereof may be found, for example, in *"The Art of Electronics"* by P. Horowitz et al., paragraph 2.13, starting on page 84 published by Cambridge University Press reprint 1995 and as illustrated in FIG. 2.38 on page 85 thereof. The three small signal amplifiers 20, 20' and 20" successively raise the level of the incoming signal from microvolts to tens of millivolts whereupon a common-emitter amplifier 21 is used as a last stage of amplification to provide a voltage of hundreds of millivolts, high enough to allow further processing.

At the end of the amplification stages there is obtained a signal with modulated data in which the envelope of the signal represents the desired data. To retrieve the data from the carrier, the signal must be filtered out. FIG. 5 shows an AM signal detector circuit 22, with a capacitor 23 at the entrance to block DC current and with a voltage divider 24 to bias the incoming signal. The biased incoming signal is rectified by a diode 25 and then filtered by a low pass filter for removal of high frequencies, thus for removal of the carrier high frequencies.

Figure 6:
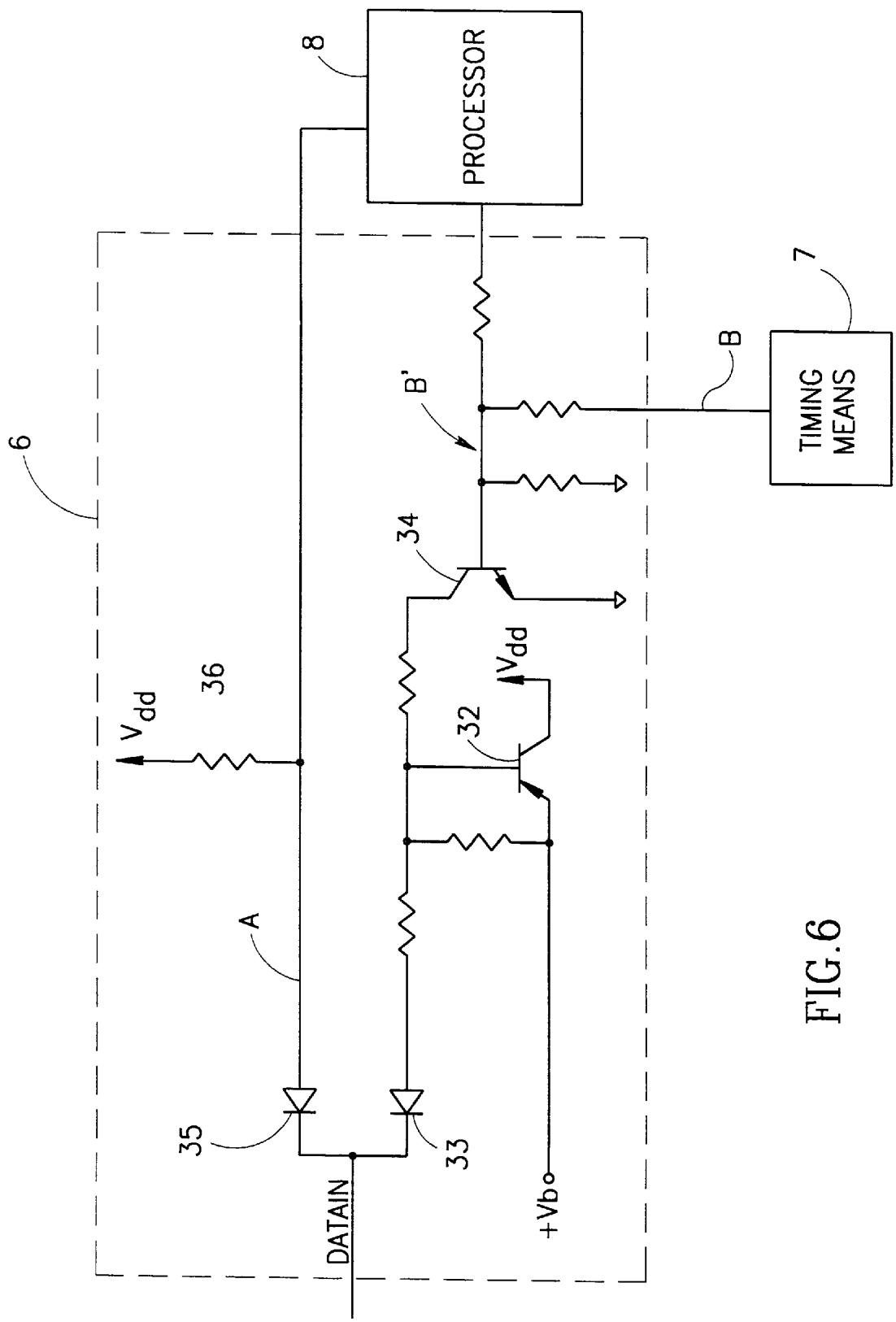
FIG. 6 is a circuit diagram showing a second detail of an electrical circuit of the smart card.
Figure 7:
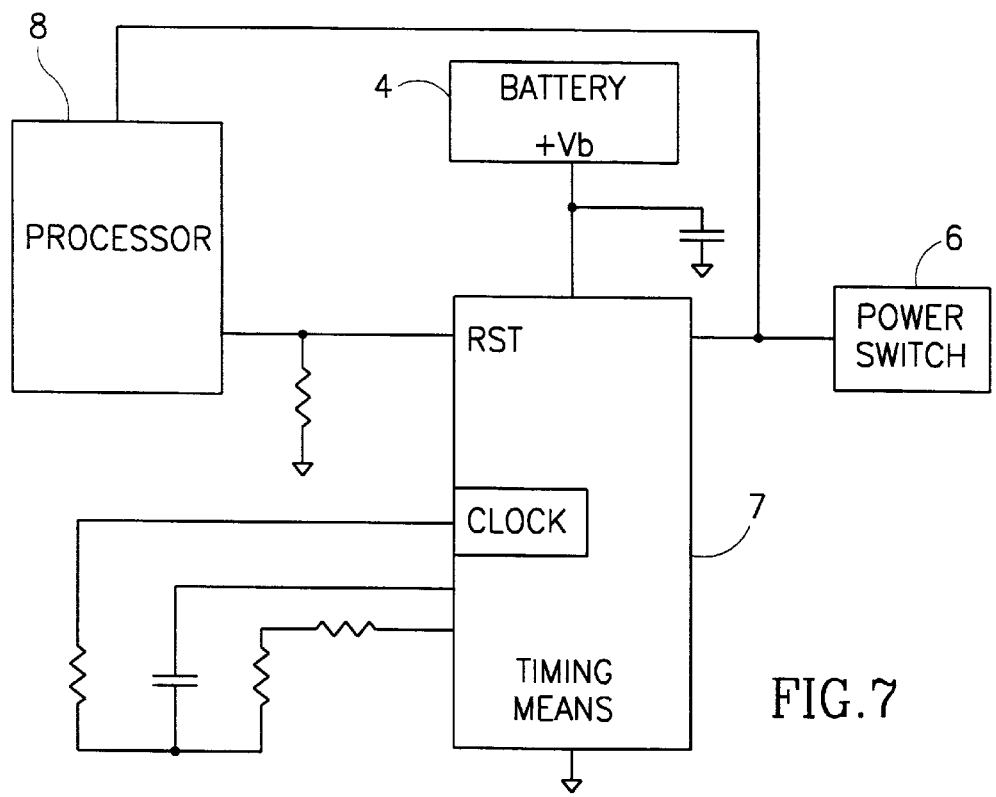
FIG. 7 is a block diagram showing functionally the timer in the smart card.

The output of the low pass filter is a square wave now fed to a level shifter 30 having the purpose of permitting passage of signals considered acceptable. In the default situation, where there is no incoming signal, transistor 31 is fed with less than the threshold voltage and is therefore in cut-off, but when there appears an incoming signal and the voltage raises above the threshold voltage, then transistor 31 reaches saturation and the output voltage drops to near zero, according to the phase inversion feature inherent to this inverted transistor connection. Thus at the input of the level shifter 30, when the filtered signal, added to the bias, reaches a preset threshold, then the output of the level shifter 30 drops to a near zero voltage. In FIG. 6 the output of level shifter 30 is denominated DATAIN and the same DATAIN is of course the input to the power switch 6, as seen in FIG. 6.

As was explained above with reference to FIG. 1, the incoming emissions received by the card triggering receiver 5 awaken the SC 1 to active state. For this purpose the output of level shifter 30 is fed to power switch 6, as shown in detail in FIG. 6, for effecting connection of the battery 4 to the rest of the components of SC 1. In the default state, when the card triggering receiver 5 does not capture emissions, the cathode of diode 33 is high and transistor 32 is in cut-off state and therefore blocks the power Vb from the battery 4 from supplying power to the rest of the components of SC 1. However, when an emission from card triggering receiver 5 is detected, then the level shifter 30 provides a lower level input to the cathode of diode 33, now rendering the diode conductive and lowering the voltage at the base of transistor 32 thereby turning on the transistor 32 to allow the passage of battery power Vb to the processor 8.

Figure 8A:
FIGS. 8a, 8b and 8c show graphically a train of pulses associated with the timer illustrated in FIG. 7.

The timing means 7 shown coupled to the battery 4 in FIG. 1 contain a clock (not shown in FIG. 1) for counting pulses. Such clocks, well known in the art, usually accumulate a preset number of n pulses, as shown in FIG. 8(*a*). The n counts are collected at a first voltage level and when all n are accumulated, there is a jump to a second voltage level to repeat the same process of amassing counts, followed by more counting at the first voltage level, creating a square wave as shown in FIG. 8(*b*). In the present invention, when the number of counts is accumulated and the voltage levels jumps for the first time to the second, higher level, the timing means 7 (shown in FIG. 6) raises the voltage at the base of transistor 34. The transistor 34 is thereby brought into saturation thus also coupling the base of the transistor 32 to ground. Consequently the transistor 32 is likewise brought into saturation, thereby connecting the battery voltage Vb to the processor 8 and other components in the card. The processor 8 is thus energized, albeit without yet being provided with instructions regarding the task to be accomplished.

When energized, the processor 8 starts to search for directives by investigating the nature of the "powering on" through an elimination process based on the inspection of the origin of the awakening signal. There are three possible sources to the activation of processor 8, namely the timing means 7, or emissions from the Triggering Station (TS) 2 and finally, signals from the Send and Receive Station (SRS) 3 which will be explained in detail below. Referring now to FIG. 1, the processor 8 first checks for signals coming in from the timing means 7 at point B, then tests the status of the card triggering receiver 5 at point A and ends with inspection of the SR transceiver 40 at point C. Even though the SRS 3 and the SR transceiver 40 have yet to be explained, it suffices for the present to understand that there is a third point C to be reviewed by the process for determining the source of the awakening signal of processor 8.

Figure 8B:
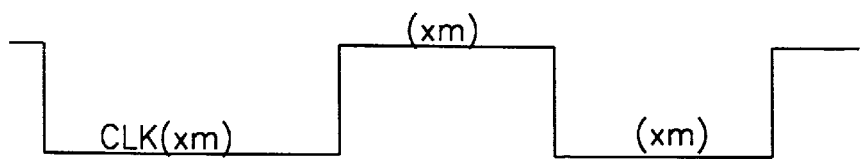
Figure 8C:
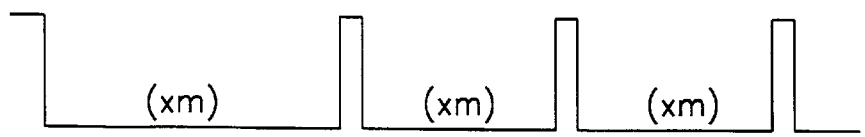

In most cases it is the power switch 6 which energizes the processor 8 and thus if there is a voltage at B, the source of the command is with the timing means 7. In this case, the processor 8, awakened by the wake-up command ensuing from the accumulation of counts, takes measures to store in memory one time pulse, to deliver a reset command to the timing means 7 for restarting the counter from zero and to return the SC 1 to the dormant state. FIG. 8(b) shows how counts are cyclically accumulated, initially at a first voltage level, and subsequently at a second voltage level. The reset command also resets the counter to the lower first voltage level, to save energy, as depicted in FIG. 8(c). The SC 1 thus counts at low power consumption while in the dormant state.

Again in FIG. 1, when processor 8 does not sense a signal coming from the timing means 7, then the card triggering receiver 5 is checked as being the possible source, in which case processor 8 treats the incoming transmission as data. Otherwise, the occurrence of a signal appearing from the SRS 3 is investigated.

The effects of inductive reception by card triggering receiver 5, providing both higher and lower level voltage inputs to the SC 1 will now be explained, in connection with the operation of the power switch 6, with reference to FIG. 6. When a lower level signal is received by DATAIN, the diode 33 is forward biased and couples the +Vb rail from the battery 4 (shown in FIG. 1) to SC 1. In contrast, when DATAIN is fed with a high level signal, the diode 33 is reverse biased, the PNP transistor 32 is cut-off and the battery 4 is disconnected. It may be desired to allow the battery to remain connected even when DATAIN is a high level signal. To achieve this, the processor 8 feeds a high level signal at B' to turn on the NPN transistor 34. As a result, the grounded emitter voltage is effectively fed to the base of the PNP transistor 32 thus maintaining it conducting.

It will now be explained how data is received by processor 8, via A in FIG. 1. When there is no induced signal at the card triggering receiver 5, the level of the DATAIN signal is high, owing to the cut-off state of the transistor 31 in FIG. 5 and a pull up resistor 36 (shown in FIG. 6) which connects the high voltage rail Vdd via a rectifier diode 35 to the collector of the NPN transistor 31 in the level shifter 30. When power is induced, DATAIN goes low and diode 35 becomes conductive, thereby feeding a low level input to processor 8. Alternatively, when there is a high level signal at DATAMN, then the diode 35 is cut-off and the pull up resistor 36 changes the state of input at point A to high level.

The data transaction system also comprises at least one additional station besides the TS stations, namely the send and receive station (SRS) 3 shown in FIG. 1. SRS 3 is a bi-directional contactless inductive coupling communication station for proximity data exchange with a card send and receive (SR) transceiver 40, which is a component of SC 1, coupled downstream of power switch 6 and connected to the processor 8. Preferably, the SRS 3 emits at the frequency of 13.56 MHz, in compliance with the ISO 14443. The implementation of the SRS 3 is accomplished according to the teachings of above-referenced U.S. Pat. No. 5,241,160. When SC 1 comes within proximity of the SRS, e.g. within 15 cm thereof, power is inductively transferred by SRS 3 to the card SR transceiver 40 for energizing SC 1, and bidirectional data exchange may start. Data exchange between SRS 3 and card SR transceiver 40 relies upon existing protocols detailed in our U.S. Pat. No. 5,241,160. The transfer of power by induction saves battery power but, if desired, the battery 4 may be employed for powering SC 1. To this end, the card SR transceiver 40 is coupled to the first control link 10, intended for the actuation of the power switch 6. When the card SR transceiver 40 detects an incoming transmission from SRS 3, a command signal is fed to the power switch 6, via the first control link 10, which thus closes and connects the battery thereby providing energy to the card SR transceiver 40 as well as to processor 8.

In a further embodiment, the SRS 3 may be provided with contacts, similar to the contacts 41 coupled to the processor 8 as shown in FIG. 1. Contacts 41 may be implemented as a standard ISO 7816 contact field. The contacts 41 are efficient not only for contact communication between an outside station such as the SRS 3 and the SC 1, but also as a further energy saving scheme. Thus, the SRS 3 may provide energy for operation of the SC 1 either by contactless inductive proximity communication or by direct contact. In parallel, communication between the SRS 3 and the SC 1 is flexible in the sense that data transfer may be established either by proximity or by contact.

The SRS 3 also functions as the vehicle for loading a predetermined instruction set into the SC 1, representing rules for compliance. The rules may be dictated either by safety considerations, quality assurance demands or any other valid obligation for which regulations are set and for which compliance records must be collected and maintained. The instruction set is fed by the SRS 3 to the SC 1 where they are stored in a code memory (not shown) within the processor 8.

The predetermined instruction set may induce the SC 1 to provide a warning when preset limit conditions are trespassed, by utilization of warning means 42 coupled to processor 8, as depicted in FIG. 1. An alert may thus be entered into a manufacturing process controller, or a cognizable caution signal may be delivered to a bearer of SC 1, in the form of an audible, visual or tactile alarm, implemented correspondingly as a buzzer, a LED or a vibrator. Moreover, especially with human operators, the alert capability is not restricted to a single reminder but may be repetitive. Likewise, a warning is not restricted to imminent trespassing but may be efficient as a signal for real time non-compliance or even as a feedback signal indicating that rules have been strictly kept. It is to be remembered that the same warning means 42 may emit different alarm signals, each referring to distinct instances.

The operation of the data transaction system will now be described with reference to the scenario wherein a watchman is required to check a facility and optionally to enter and operate a device, such as for example, to open and close a valve. The inspection is not obligatory but may be carried out at the watchman's discretion during his shift on condition that if the facility is entered into, then the valve must be operated. The data system is required to store in memory the time of entrance into the facility, to record the fact that the valve was activated and the time of activation and also, whether the facility were exited without the valve having been operated. The condition imposed on the watchman is thus related to a location—the facility—with the time of the event being secondary.

The watchman begins his tour of duty by contactless "punching in" of the SC 1 when passing near to the SRS 3, the SC 1 awakens, upon which the SRS 3 loads memory 9 of the SC 1 with the actual time of the day and starts the timing means 6 to count the elapsed time. The SC 1 then returns to the dormant state. It is taken for granted that a predetermined instruction set was prepared and loaded into SC 1 in due time. When entering the facility, the watchman comes into range of the TS 2 which triggers SC 1 to active mode and records the identity of the TS as TS 2. The set of predetermined instructions residing as an application in processor 8 commands SC 1 to store the event of entrance in the facility and the time elapsed since the begin of duty in memory 9 and to return to dormant state. When a real time clock is used instead of a counter, the exact time is simply read into memory. Should the watchman open or close the valve, then another TS coupled to the device, namely TS 2' in connection with the valve in this case, starts continuously to emit modulated inductive emissions for a certain length of time, thereby awakening the SC 1 with data that identifies the TS 2' and which is received by the SC 1 as a sign of compliance. The system now sets a compliance flag to "ON" and stores the time elapsed since the entrance of the facility into memory 9 and SC 1 returns to dormant state. Should the watchman try to exit the facility without operating the valve, thus with the compliance flag set to "OFF", then SC 1 will again come into range of the first encountered, still continuously emitting, TS 2 and be triggered thereby. The predetermined instruction set of the SC 1 will thus detect an attempt to exit while the compliance flag is set to "OFF" and will instruct processor 8 to execute a reminder warning to the watchman. The watchman may either comply with or disregard the instructions but the events and their timing will be recorded in memory 9. At the end of his shift, the watchman returns with SC 1 to near SRS 3 for "punching out" whereby the "punch out" time is recorded and the data accumulated in memory 9 is downloaded into SRS 3 where it may be processed for delivery or later transfer of the processing results. SRS 3 may also transfer the data for processing elsewhere.

For the calculation of the time of the day from the data retrieved from SC 1, the SRS 3 first deducts the "punch in" time, as stored in memory 9, from the time of "punch out" and then divides this difference by the total number of pulses stored in SC 1. The result of this subtraction provides the exact duration of one single pulse, whereby it becomes possible to calculate the time of every event by adding to the "punch in" time the multiplication of the number of pulses recorded until the time of the event times the duration of each pulse, as calculated. When a real time clock is used instead of timing means 7, the time calculation described above becomes superfluous since SC 1 records the time of the day directly, as opposed to an elapsed time count.

As another example consider the scenario wherein the watchman must observe time-relate instructions, i.e. wherein events are dictated by time rather than location, such as entrance into a facility, as was the case in the previous scenario. The watchman could be required to enter a facility according to a time sequence and to operate a succession of devices according to certain rules. As before, SC 1 will first be "punched in" at the start of the shift, to reset all counters and flags. During work, if the instructions are not adhered to, such as a facility not being entered on time, then a warning will be conveyed to the watchman who will either comply or not, knowing that his behavior is recorded. As before, entrance of the facility at short range with TS 2 will trigger SC 1 to the active state. The series of devices to be actuated will each activate identified TS data from a corresponding series of appropriate TSs, such as TS 2', TS 2", TS 2'" and so on. Thus each device to be operated corresponds to a unique $TS^n$ with a well defined identity. Care is taken for the emissions of the TSs to stay separate from each other by time sharing or by separation of reception areas, not to interfere with each other and not to emit concurrently. As before, SC 1 goes dormant whenever possible, to be awakened only when the need arises.

Should the watchman not abide to the rules or make mistakes in the sequence of operations, he will again be alerted and he will either correct or disregard the reminder. Again, events and their timing will be recorded in memory 9, to be read by SRS 3 at the end of the workshift.

Figure 9:
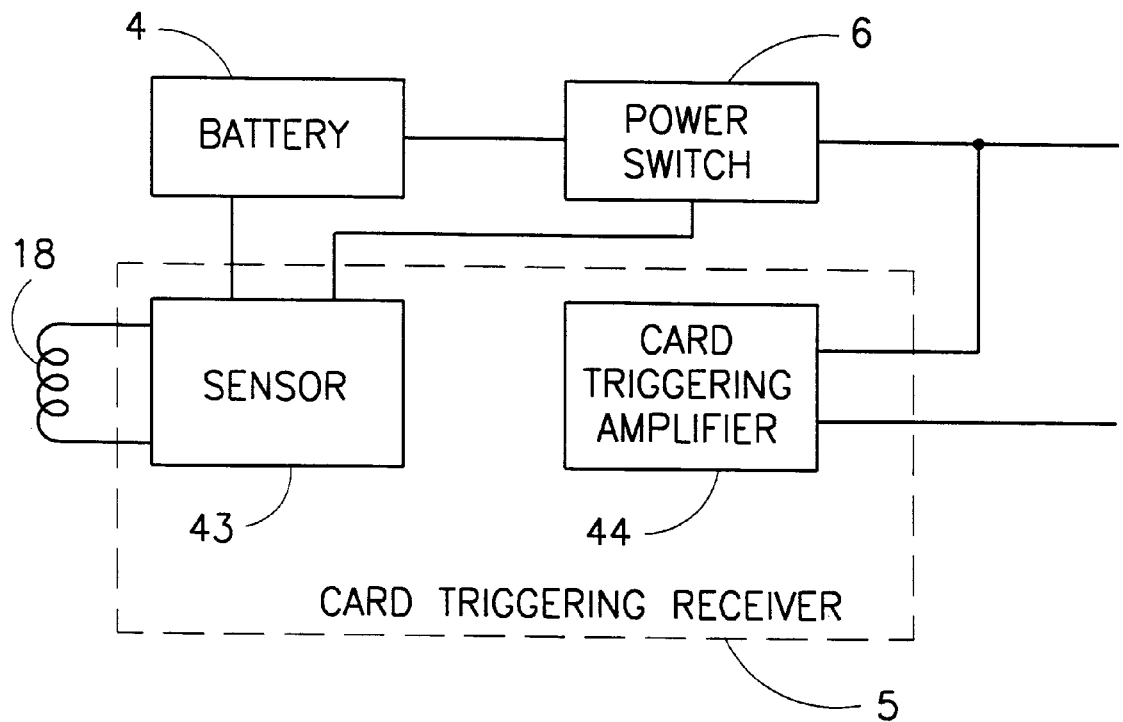
FIG. 9 is a block diagram showing functionally an emission detection sensor for use with the smart card in the system illustrated in FIG. 1.

Another embodiment of the invention is shown in FIG. 9, allowing for further energy savings by providing for both a sensor 43 and a card triggering amplifier 44, constituting a card triggering receiver 5. The card triggering amplifier 44 is coupled downstream of the power switch 6 and linked to sensor 43. Sensor 43 is continuously coupled to battery 4 and to the control port of the power switch 6, for the purpose of detecting the presence of inductive emissions and if such emissions are encountered, to command closure the power switch 6. Closure of power switch 6 hence connects the battery 4 to the card triggering amplifier 44 as well as to the rest of the components of SC 1 thereby rising SC 1 to the active state. As sensor 43 consumes much less energy than a complete card triggering receiver 5, this embodiment is energetically advantageous.

Figure 10:
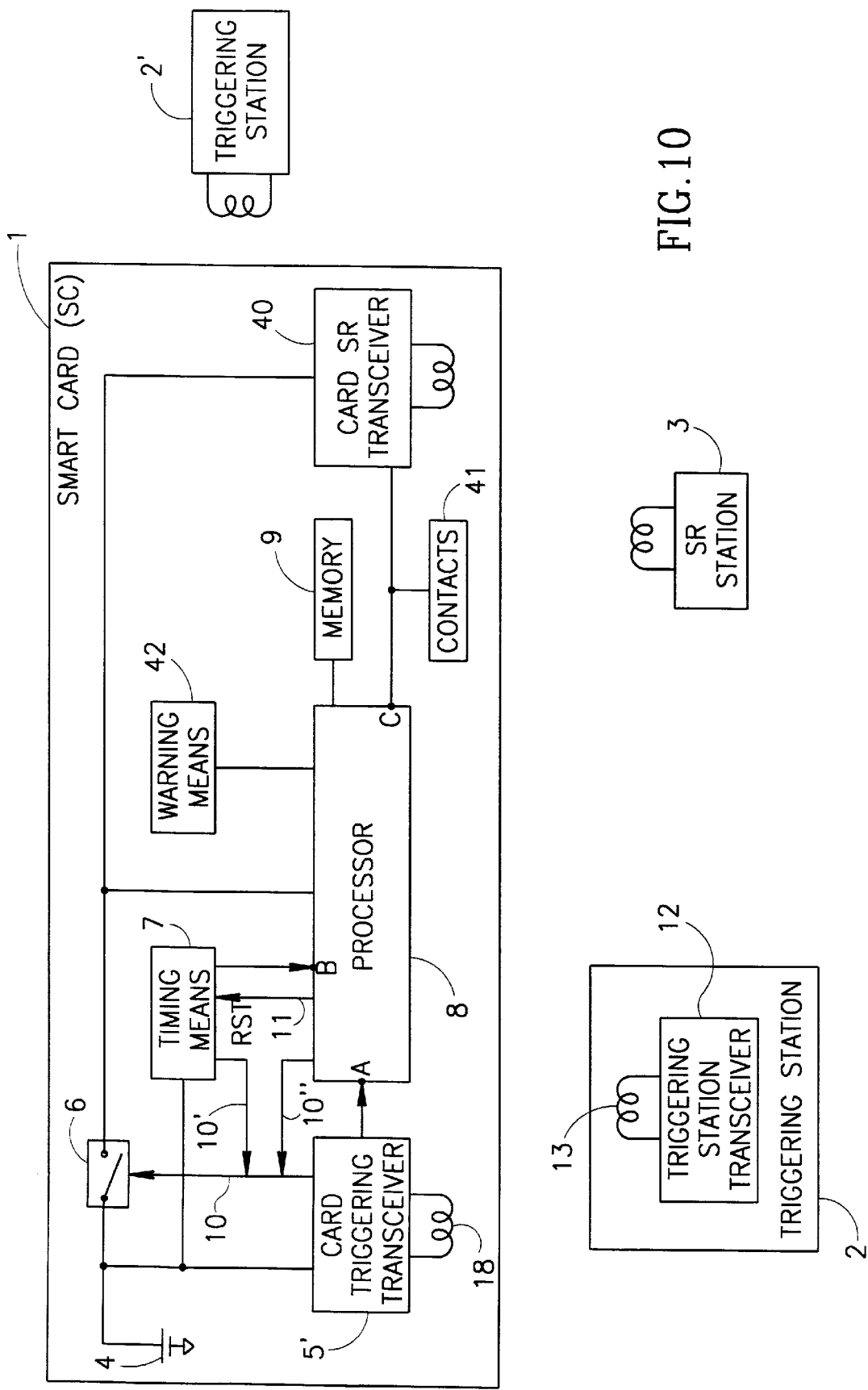
FIG. 10 is a block diagram showing functionally a data transaction and monitoring system in accordance with another embodiment of the invention; is

Yet a further embodiment of the invention is shown in FIG. 10. The SC 1 now comprises a card triggering transceiver 5' for emitting data and signals in inductive short range communication, instead of featuring only a card triggering transceiver 5 as illustrated by FIG. 1. The nature of the communication method remains the same as was described above, with the difference that when the SC 1 emits, the roles are switched in the sense that the triggering station transceiver 12 is now the receiver of the modulated inductive emissions sent by the card triggering transceiver 5'.

Figure 11:
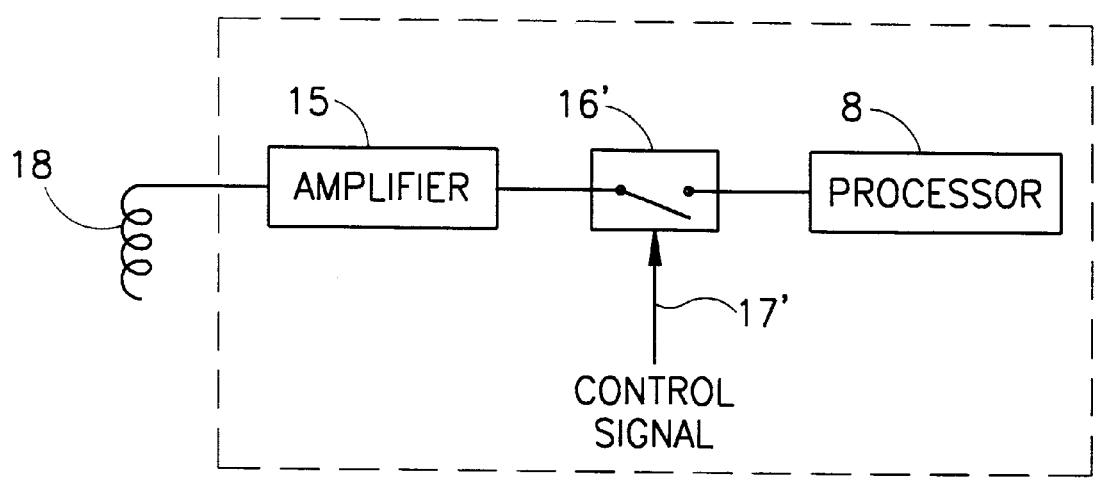
FIG. 11 is a block diagram showing an emitter for use with the system of FIG. 10.

FIG. 11 shows the elements participating in the emission of signals from SC 1, which in fact represent the implementation of the circuit of FIG. 4, originally being part of the triggering station transceiver 12, on board of SC 1. In FIG. 11 there is seen processor 8 for the generation of the carrier wave, coupled to amplifier 15' also coupled to the TS loop antenna 18. A control signal switch 16', operated by a control signal 17', is inserted between the output of the processor 8 and the input to the amplifier 15' to allow coupling or decoupling of the amplifier 15' from the processor 8. It is seen that processor 8 now plays the role of the former oscillator 14 in FIG. 4 and also provides the control signal 17' to the control signal switch 16'.

The TS 2 receives inductive emissions from the SC 1 with exactly the same amplifying elements as shown in FIG. 5. However, in this case the loop antenna 18 communicates with the loop antenna 13 shown in FIG. 3 as adapted and transformed into FIG. 11 and forming part of the SC 1; and the circuit of FIG. 5 is now implemented in the triggering station transceiver 12 of TS 2.

Whilst a preferred embodiment of the invention has been described in detail, it is apparent that many modifications and variations thereto are possible, all of which fall within the true spirit and scope of the invention. For example, the system is for use with multiple smart cards, with many TSs 2 and SRSs 3. Also, other configurations are possible for the implementation of the smart card especially regarding to the discrete component. Furthermore, the same TS and SRS, single or multiple, may be used for sets of smart cards monitoring diverse activities. For example, a watchman and a production worker may make use of the same equipment but their smart cards may be loaded with different predetermined instructions. Also, the sensors coupled to a TS are not limited to device activation sensing, but may allow for detection of physical parameters such as temperature, illumination, humidity, radiation and noise detection. It will also be appreciated that the invention is not restricted to process monitoring but is applicable to other tasks as well.

What is claimed is:

1. A dual range proximity and in-range smart card data transaction system, comprising:

a triggering station comprising a triggering transceiver for effecting data transfer with a smart card by inductive coupling communication when in a predetermined range thereof;

a send and receive station for effecting bi-directional communication with the smart card by inductive coupling when in proximity therewith;

the smart card comprising:

a semiconductor device coupled to a coil antenna for effecting data communication with a remote coil antenna so as to receive a signal therefrom, and an amplifier coupled to the coil antenna for amplifying said signal so as thereby to extend an operating range of the smart card and allow an in range communication with the triggering station, a battery for supplying energy to the amplifier and to components of the smart card during in-range mode, a card triggering receiver for effecting inductive coupling and defined area of communication with the triggering station so as to receive data therefrom upon passage within a predetermined area of the triggering station, a memory for storing a predetermined instruction set for process monitoring, a processor coupled to the card triggering receiver and to the memory and responsive to the predetermined instruction set for operating functions of the smart card, and a card transceiver coupled to the processor for effecting non-contact inductive coupling communication with the send and receive station and being at least partially powered by energy received therefrom for allowing data transfer when within close proximity of the send and receive station;

whereby the send and receive station may load predetermined instruction sets into and retrieve data from the smart card for processing by the processor and for data transfer of processed data to the send and receive station via the card transceiver and for receiving data via the send and receive station.

2. The system according to claim 1, wherein:

the card triggering receiver receives a triggering signal upon passage within a predetermined range of the triggering station, and the triggering transceiver triggers the smart card from a dormant state to an active state or vice versa in accordance with said data and with the predetermined instruction set.

3. The system according to claim 1, wherein:

the active state comprises a partially active state and a fully active state, the triggering transceiver is responsive to the received data for triggering the smart card from the dormant state to the partially active state, and the processor is responsive to the instruction set for setting the smart card to a desired state.

4. The system according to claim 1, wherein:

the triggering station comprises:

a triggering station coil antenna coupled to the triggering station transceiver for emitting signals and modulated data generated by the triggering station transceiver; and the smart card triggering receiver comprises:

a card triggering coil antenna for receiving said signals and modulated data so as to provide for short range inductive coupling data transfer between the triggering station and the smart card.

5. The system according to claim 1, wherein:

the card triggering receiver includes a resonant circuit having a resonant frequency tuned to a frequency of the triggering station transceiver.

6. The system according to claim 1, wherein the card triggering receiver includes a matched antenna circuit for maximizing the efficiency thereof.

7. The system according to claim 1, wherein the triggering station operates at a frequency between 100 KHz and 150 KHz.

8. The system according to claim 1, wherein the triggering station operates at a frequency of 125 KHz.

9. The system according to claim 1, wherein the triggering station and the card triggering receiver effect inductive coupling communication over a range of up to 15 m.

10. The system according to claim 1, wherein the smart card further comprises:

a power switch connected between the battery and the processor and being responsively coupled to the card triggering receiver for connecting the battery to or disconnecting the battery from the processor;

whereby the processor and associated components of the smart card are de-energized while the power switch is open.

11. The system according to claim 1, wherein the smart card further comprises:

a sensor coupled to the card triggering coil antenna for generating a sensor signal upon receipt of said triggering signal, and a power switch connected between the battery and the processor and being responsively coupled to the sensor signal for connecting the battery to or disconnecting the battery from the processor;

whereby the processor and associated components of the smart card are de-energized while the power switch is open.

12. The system according to claim 1, wherein the smart card further comprises:

a power switch connected between the battery and the processor and being responsively coupled to the card triggering receiver for connecting the battery to or disconnecting the battery from the processor;

the smart card being in the dormant state or the active state, according to whether the power switch is open or closed, respectively.

13. The system according to claim 1, wherein:

the triggering station comprises:

a triggering station coil antenna coupled to the triggering station transceiver for emitting signals and modulated data generated by the triggering station transceiver; and the smart card further comprises:
a sensor coupled to the card triggering coil antenna for generating a sensor signal upon receipt of said triggering signal, and
a power switch connected between the battery and the processor and being responsively coupled to the sensor signal for connecting the battery to or disconnecting the battery from the processor;
the card triggering coil antenna being coupled to the card triggering receiver for receiving said signals and modulated data so as to provide for short range inductive coupling data transfer between the triggering station and the smart card, and
the smart card being in the dormant state or the active state, according to whether the power switch is open or closed, respectively.

14. The system according to claim 13, wherein the power switch is responsively coupled to the processor for operating in accordance with said predetermined instruction set and data.

15. The system according to claim 13, wherein the smart card further comprises:
a timer coupled between the battery and the power switch and being responsively coupled to the processor for providing time reference signals thereto for storage in said memory.

16. The system according to claim 15, wherein the timer includes a counter for counting a predetermined number of accumulated counts indicative of an elapsed time period equal to a specified time unit and being programmed to forward to the memory, via the processor, one pulse upon each predetermined number of accumulated counts.

17. The system according to claim 16, wherein:
the processor is responsively coupled to the timer for resetting the counter to zero after each time unit, and
the power switch is responsive to the processor for opening when the counter is reset to zero;
whereby the processor may be de-energized during accumulation by the timer of successive time units, while being periodically energized for keeping track of successive time units.

18. The system according to claim 15, wherein the timer is a real time clock programmed to forward real time to the memory, via the processor.

19. The data transaction system according to claim 13, wherein the smart card further comprises:
a warning indicator coupled to the power switch and the processor and being responsive to said predetermined instruction set for providing a warning signal upon occurrence of a specified event.

20. The system according to claim 19, wherein:
an alarm is coupled to the warning indicator and responsive to the warning signal for emitting an alarm signal or a combination of alarm signals cognizable to one or more human senses.

21. The system according to claim 20, wherein the alarm is a buzzer.

22. The system according to claim 20, wherein the alarm is a LED.

23. The system according to claim 20, wherein the alarm is a vibrator.

24. The system according to claim 1, wherein:
the card triggering receiver is responsively coupled to the processor for receiving triggering signals, thereby allowing the processor to store in the memory data relating triggering signals to elapsed time.

25. The system according to claim 1, wherein
the triggering station emits modulated inductive emissions comprising time signals, and
the processor stores in memory the emissions received by the card triggering receiver.

26. The data transaction system according to claim 1 wherein:
the card triggering receiver receives a triggering signal upon passage within a predetermined range of the triggering station,
the triggering transceiver triggers the smart card from a dormant state to an active state or vice versa in accordance with said data and with the predetermined instruction set,
the card triggering receiver is responsive to received data for initiating a triggering signal and obtaining time information, and
the triggering transceiver stores the time information in memory.

27. The system according to claim 1, wherein
data representative of said event is stored in memory in association with elapsed time and received data and signals.

28. The system according to claim 1, wherein:
the card transceiver is coupled to the processor and the smart card is energized by mutual inductive coupling with the send and receive station.

29. The system according to claim 1, wherein:
the smart card further comprises contacts coupled to the card transceiver for effecting contact communication with the send and receive station, and
the send and receive station further comprises contacts coupled to the processor for coupling with the contact field of the smart card;
thereby allowing bi-directional contact data transfer between the smart card and the send and receive station.

30. The system according to claim 29, wherein the contacts allow energy transfer from the send and receive station for powering of the smart card.

31. The system according to claim 1, wherein the station emits at a frequency between 1 MHz and 60 MHz.

32. The system according to claim 1, wherein the station emits at a frequency of 13.56 MHz in accordance with ISO 14443.

33. The system according to claim 1, wherein the send and receive station transceiver and the card transceiver provide for a proximity communication range of up to 20 cm.

34. A data transaction system according to claim 1, comprising a smart card and at least two triggering stations; wherein:
the card triggering transceiver effects bi-directional inductive coupling communication with each triggering station so that upon passage within predetermined range of the respective triggering station the smart card emits signals and modulated data generated by the card triggering transceiver, and
each triggering station comprises a respective triggering transceiver for receiving the signals and modulated data emitted by the smart card.

* * * * *